(12) United States Patent
Kim et al.

(10) Patent No.: US 9,891,670 B2
(45) Date of Patent: Feb. 13, 2018

(54) FOLDABLE DISPLAY

(71) Applicant: Samsung Display Co., Ltd., Yongin-si, Gyeonggi-do (KR)

(72) Inventors: Hoonsik Kim, Seongnam-si (KR); Young Do Kim, Cheonan-si (KR); Suk Choi, Hwaseong-si (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 140 days.

(21) Appl. No.: 14/970,334

(22) Filed: Dec. 15, 2015

(65) Prior Publication Data
US 2016/0246330 A1 Aug. 25, 2016

(30) Foreign Application Priority Data
Feb. 25, 2015 (KR) .................. 10-2015-0026681

(51) Int. Cl.
*G06F 1/16* (2006.01)

(52) U.S. Cl.
CPC .......... *G06F 1/1652* (2013.01); *G06F 1/1643* (2013.01); *G06F 1/1675* (2013.01); *G06F 1/1679* (2013.01); *G06F 1/1684* (2013.01)

(58) Field of Classification Search
CPC .................. G06F 1/1652; G06F 2203/0412
See application file for complete search history.

(56) References Cited

U.S. PATENT DOCUMENTS

| 8,564,551 B2 | 10/2013 | Park et al. | |
|---|---|---|---|
| 2010/0219943 A1* | 9/2010 | Vanska | G06F 1/163 340/407.1 |
| 2014/0320393 A1* | 10/2014 | Modarres | G06F 3/017 345/156 |
| 2015/0133193 A1* | 5/2015 | Stotler | G06F 1/163 455/557 |

FOREIGN PATENT DOCUMENTS

| KR | 10-2009-0023501 A | 3/2009 |
|---|---|---|
| KR | 10-2012-0117140 A | 10/2012 |
| KR | 10-1292974 B1 | 7/2013 |
| KR | 10-2013-0113784 A | 10/2013 |
| KR | 10-2014-0092059 A | 7/2014 |

* cited by examiner

*Primary Examiner* — Kevin M Nguyen
(74) *Attorney, Agent, or Firm* — Knobbe, Martens, Olson & Bear, LLP (57) ABSTRACT

A foldable display is disclosed. In one aspect, the foldable display includes a foldable display panel and a folding adjustment part configured to adjust a folding configuration of the foldable display panel. The foldable display also includes a folding sensor configured to sense the folding configuration, a rear surface touch sensor configured to sense a touch input applied to a rear surface of the foldable display panel, and a controller. The controller is configured to detect first and second touch inputs applied to different portions of the rear surface and control the folding adjustment part so as to switch the folding configuration of the foldable display panel when the controller detects that the first touch input moves in a first direction and the second touch input moves in a second direction different from the first direction.

20 Claims, 8 Drawing Sheets

FOLDABLE DISPLAY

CROSS-REFERENCE TO RELATED APPLICATIONS

This U.S. non-provisional patent application claims priority under 35 U.S.C. § 119 of Korean Patent Application No. 10-2015-0026681, filed on Feb. 25, 2015, the entire contents of which are hereby incorporated by reference.

BACKGROUND

Field

The described technology generally relates to a foldable display.

Description of the Related Technology

Display devices are a type of electronic apparatus that can display images. Examples of display devices include televisions, computer monitors, personal digital assistants (PDAs), and smart devices, etc.

Certain display devices, such as organic light-emitting diode (OLED) displays, liquid crystal displays (LCDs), plasma display panels (PDPs), and electrophoretic displays (EPDs), have been adapted to display high-definition images.

Recently, foldable displays which can be arranged into various configurations for portability and various other uses have been developed. Users can fold or unfold a foldable display to adjust the available surface area in a display region according to the purpose of use so that the foldable display can be more simply and efficiently used.

SUMMARY OF CERTAIN INVENTIVE ASPECTS

One inventive aspect is a foldable display that can automatically adjust a folding configuration based on a touch input.

Another aspect is a control method for a foldable display in which a folding configuration can be switched more easily and conveniently.

Another aspect is a foldable display including: a foldable display panel positioned at a front surface of the foldable display; a folding adjustment part adjusting a folding configuration of the foldable display panel, the folding configuration including a first configuration in which the foldable display panel is folded along a folding axis, and a second configuration in which the foldable display panel is unfolded; a folding sensor part sensing the folding configuration of the foldable display panel; a rear surface touch sensor part sensing a touch input applied to a rear surface of the foldable display panel, the rear surface being subdivided into first and second rear surface regions with respect to the folding axis of the foldable display panel; and a control part controlling the foldable display panel, the folding adjustment part, the folding sensor part, and the rear surface touch sensor part, wherein the control part detects a first input applied to the first rear surface region and a second touch input applied to the second rear surface region by using the rear surface touch sensor part, and switches the folding configuration of the foldable display panel by using the folding adjustment part when it is detected that the first touch input moves in a first direction, and the second touch input moves in a second direction different from the first direction.

The control part can switch the foldable display panel from the first configuration to the second configuration, or from the second configuration to the first configuration by using the folding adjustment part, when the first touch input in the first direction and the second touch input in the second direction are detected.

The first configuration can be a configuration in which the foldable display panel is folded along the folding axis, so that the foldable display panel is not exposed to the environment, and the second configuration can be a configuration in which the foldable display panel is unfolded, so that the foldable display panel is exposed to the environment.

The control part, by using the rear surface touch sensor part, detects a first distance which is a moving distance of the first touch input in the first direction, and a second distance which is a moving distance of the second touch input in the second direction, and the folding configuration of the foldable display panel can be switched based on the detected first and second distances.

The control part can switch the folding configuration of the foldable display panel, when the first distance is greater than a first threshold distance, and the second distance is greater than a second threshold distance.

The first and second threshold distances can be substantially the same.

The control part can determine a switching amount of the folding configuration of the foldable display panel according to the detected first and second distances.

The control part can determine a folding angle or an unfolding angle of the foldable display panel in proportion to the detected first and second distances, and switch the folding configuration of the foldable display panel by as much as the determined folding or unfolding angles.

The control part, by using the rear surface touch sensor part, can detect a first speed which is a moving speed of the first touch input in the first direction, and a second speed which is a moving speed of the second touch input in the second direction, and the folding configuration of the foldable display panel can be switched based on the detected first and second speeds.

The control part can switch the folding configuration of the foldable display panel, when the first speed is greater than a first threshold speed and the second speed is greater than a second threshold speed.

The first and second threshold speeds can be substantially the same.

The control part can determine a switching amount of the folding configuration of the foldable display panel according to the detected first and second speeds.

The control part can determine a folding angle or an unfolding angle of the foldable display panel in proportion to the detected first and second speeds, and switch the folding configuration of the foldable display panel by as much as the determined folding or unfolding angles.

The first and second directions can be substantially opposite to each other.

The foldable display can include a shape-memory film which is formed thereon and is formed of shape-memory alloy or shape-memory polymer.

Another aspect is a method of controlling a foldable display, the method including: detecting first and second touch inputs to a rear surface of the foldable display, wherein the rear surface is subdivided into first and second rear surface regions with respect to a folding axis of the foldable display, the first touch input is a touch input applied to the first rear surface region, and the second touch input is a touch input applied to the second rear surface region; detecting that the first touch input moves in a first direction and the second touch input moves in a second direction different from the first direction; and switching a folding configuration of the foldable display, the folding configuration including a first configuration in which the foldable display is folded along the folding axis, and a second configuration in which the foldable display is unfolded.

The switching of the folding configuration can include switching the foldable display from the first configuration to the second configuration or from the second configuration to the first configuration.

The method for controlling the foldable display can further include detecting a first distance which is a moving distance of the first touch input in the first direction, and a second distance which is a moving distance of the second touch input in the second direction; and switching the folding configuration of the foldable display based on the detected first and second distances.

The method for controlling the foldable display can further include detecting a first speed which is a moving speed of the first touch input in the first direction, and a second speed which is a moving speed of the second touch input in the second direction; and switching the folding configuration of the foldable display based on the detected first and second speeds.

The first and second directions can be substantially opposite to each other.

Another aspect is a foldable display comprising a foldable display panel; a folding adjustment part configured to adjust a folding configuration of the foldable display panel, wherein the folding configuration comprises a first configuration in which the foldable display panel is folded along a folding axis and a second configuration in which the foldable display panel is unfolded; a folding sensor configured to sense the folding configuration of the foldable display panel; a rear surface touch sensor configured to sense a touch input applied to a rear surface of the foldable display panel, wherein the rear surface is divided along the folding axis into first and second rear surface regions; and a controller configured to control the foldable display panel, the folding adjustment part, the folding sensor, and the rear surface touch sensor, wherein the controller is further configured to: detect a first touch input applied to the first rear surface region and a second touch input applied to the second rear surface region via signals received from the rear surface touch sensor; and control the folding adjustment part so as to switch the folding configuration of the foldable display panel when the controller detects that the first touch input moves in a first direction and the second touch input moves in a second direction different from the first direction.

In exemplary embodiments, the controller is further configured to control the folding adjustment part to switch the foldable display panel from the first configuration to the second configuration or from the second configuration to the first configuration when the controller detects that the first touch input moves in the first direction and the second touch input moves in the second direction.

In exemplary embodiments, the first configuration is a configuration in which the foldable display panel is folded along the folding axis such that the foldable display panel is closed, and wherein the second configuration is a configuration in which the foldable display panel is unfolded such that the foldable display panel is open.

In exemplary embodiments, the controller is further configured to detect i) a first distance which is a moving distance of the first touch input in the first direction and ii) a second distance which is a moving distance of the second touch input in the second direction via the signals received from the rear surface touch sensor, and wherein the controller is further configured to control the folding adjustment part so as to switch the folding configuration of the foldable display panel based on the detected first and second distances.

In exemplary embodiments, the controller is further configured to control the folding adjustment part so as to switch the folding configuration of the foldable display panel when the controller detects that the first distance is greater than a first threshold distance and the second distance is greater than a second threshold distance.

In exemplary embodiments, the first and second threshold distances are substantially the same.

In exemplary embodiments, the controller is further configured to determine a switching amount of the folding configuration of the foldable display panel based on the detected first and second distances.

In exemplary embodiments, the controller is further configured to: i) determine a folding angle or an unfolding angle of the foldable display panel based on the detected first and second distances, and ii) control the folding adjustment part so as to switch the folding configuration of the foldable display panel by the determined folding or unfolding angle.

In exemplary embodiments, the controller is further configured to detect i) a first speed which is a moving speed of the first touch input in the first direction and ii) a second speed which is a moving speed of the second touch input in the second direction via the signals received from the rear surface touch sensor; and control the folding adjustment part so as to switch the folding configuration of the foldable display panel based on the detected first and second speeds.

In exemplary embodiments, the controller is further configured to control the folding adjustment part so as to switch the folding configuration of the foldable display panel when the first speed is greater than a first threshold speed and the second speed is greater than a second threshold speed.

In exemplary embodiments, the first and second threshold speeds are substantially the same.

In exemplary embodiments, the controller is further configured to determine a switching amount of the folding configuration of the foldable display panel based on the detected first and second distances.

In exemplary embodiments, the controller is further configured to: i) determine a folding angle or an unfolding angle of the foldable display panel based on the detected first and second distances, and ii) control the folding adjustment part so as to switch the folding configuration of the foldable display panel by the determined folding or unfolding angle.

In exemplary embodiments, the first and second directions are substantially opposite to each other.

In exemplary embodiments, the foldable display further comprises a shape-memory film formed over the foldable display panel and formed of shape-memory alloy or shape-memory polymer.

Another aspect is a method of controlling a foldable display comprising detecting first and second touch inputs applied to a rear surface of the foldable display, wherein the foldable display is configured to be folded along a folding axis, wherein the rear surface is divided into first and second rear surface regions with respect to the folding axis, wherein the first touch input is a touch input applied to the first rear surface region, and wherein the second touch input is a touch input applied to the second rear surface region; detecting whether the first touch input moves in a first direction and the second touch input moves in a second direction different from the first direction; and switching a folding configuration of the foldable display, wherein the folding configuration comprises a first configuration in which the foldable display is folded along the folding axis and a second configuration in which the foldable display is unfolded.

In exemplary embodiments, the switching of the folding configuration comprises switching the foldable display from the first configuration to the second configuration or from the second configuration to the first configuration.

In exemplary embodiments, the method further comprises detecting a first distance which is a moving distance of the first touch input in the first direction, and a second distance which is a moving distance of the second touch input in the second direction; and switching the folding configuration of the foldable display based on the detected first and second distances.

In exemplary embodiments, the method further comprises detecting a first speed which is a moving speed of the first touch input in the first direction, and a second speed which is a moving speed of the second touch input in the second direction; and switching the folding configuration of the foldable display based on the detected first and second speeds.

In exemplary embodiments, the first and second directions are substantially opposite to each other.

BRIEF DESCRIPTION OF THE DRAWINGS

The accompanying drawings are included to provide a further understanding of the described technology and are incorporated in and constitute a part of this specification. The drawings illustrate exemplary embodiments of the described technology and, together with the description, serve to explain principles of the described technology.

DETAILED DESCRIPTION OF CERTAIN INVENTIVE EMBODIMENTS

The terms used herein are selected from general terms widely used if possible in consideration of the functions herein. Also, in specific cases, there may be terms selected by the applicants, in which case, the meaning will be described in the detailed description of the corresponding embodiment. Thus, the terms used in the specification should not be understood simply as the names thereof, but should be understood based on actual meanings of the terms and the entire contents of the specification.

Furthermore, embodiments of the described technology will be described in more detail hereinafter with reference to the accompanying drawings. However, it is to be understood that the described technology is not limited to the embodiments described below.

Hereinafter, exemplary embodiments of the described technology will be described in more detail with reference to the accompanying drawings.

Figure 1:
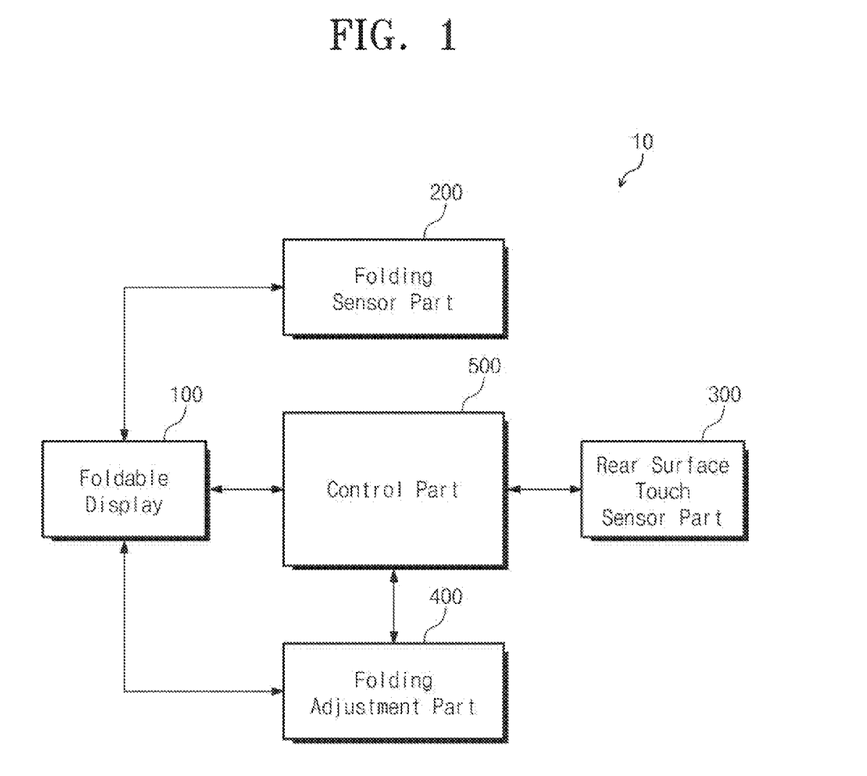
FIG. 1 is a block diagram of a foldable display according to an embodiment.

FIG. 1 is a block diagram of a foldable display according to an embodiment.

Referring to FIG. 1, the foldable display 10 includes a foldable display panel 100, a folding sensor part or folding sensor 200, a folding adjustment part 400, a rear surface touch sensor part or rear surface touch sensor 300, and a control part or controller 500.

The foldable display panel 100 can be positioned on a front surface of the foldable display 10 to display an image. Here, an image can generally refer to diverse kinds of visual information, such as a still image or a moving picture, which can be observed by a user. The foldable display panel 100 can communicate with the control part 500 and can be controlled by the control part 500.

The foldable display panel 100 can include at least one flexible display panel. Here, a flexible display generally refers to a display panel formed on a flexible substrate which can be bent, folded, or rolled without a substantial loss of display characteristics. For example, a flexible display panel can be an OLED display panel, or an EPD display panel. Accordingly, even when the foldable display 10 is folded, the display characteristics of the foldable display panel 100 are not damaged.

The folding adjustment part 400 can adjust a folding configuration of the foldable display 10. The folding configuration can include a first configuration in which the foldable display 10 is folded along a folding axis and a second configuration in which the foldable display 10 is unfolded. In some embodiments, the foldable display panel 100 is not exposed to the environment in the first configuration of the foldable display 10. At least a portion of the foldable display panel 100 can be exposed to the environment in the second configuration of the foldable display 10.

The folding adjustment part 400 can mechanically fold or unfold the foldable display 10 in response to a received folding control signal. The folding adjustment part 400 can include various mechanical capabilities to fold the foldable display 10. For example, the folding adjustment part 400 include one or more of a hinge, a motor, a spring, a pulling member, a connecting member, and a guide member to mechanically adjust the folding configuration of the foldable display 10 according to the received folding control signal. The folding adjustment part 400 can be folded or unfolded via a hinge attached to, for example, a center of the foldable display panel 100 by a motor actuated by a control signal. The folding control signal can be received from the control part 500.

The folding adjustment part 400 can be formed to have a frame shape so as to support the edges of the foldable display 10. Alternatively, the folding adjustment part 400 can be formed to have a panel shape to support the overall surface of the foldable display 10.

The folding sensor part 200 can sense the folding configuration of the foldable display 10. More specifically, the folding sensor part 200 can sense first and second configurations of the foldable display 10. The folding sensor part 200 can sense the folding configuration by using at least one sensing capability. For example, in order to sense the folding configuration of the foldable display 10 the folding sensor part 200 can include a sensing capability from including one or more of: a touch sensor, an infrared sensor, an ultraviolet sensor, a gyro, a gyroscopic sensor, a strain gauge sensor, a tilting sensor, an acceleration sensor, a depth sensor, a pressure sensor, a grip sensor, a camera sensor, an illumination sensor, and a proximity sensor.

The folding sensor part 200 can transmit a sensing result to the control part 500, and the control part 500 receiving the sensing result can detect the current folding configuration of the foldable display 10.

The rear surface touch sensor part 300 can include at least one touch sensing capability to sense a touch input applied to the rear surface of the foldable display 10. For example, the rear surface touch sensor part 300 can include a touch sensor, a pressure sensor, or an illumination sensor and can be formed on the rear surface of the foldable display 10 to sense a touch input applied to the rear surface. The rear surface touch sensor part 300 can transmit a sensing result to the control part 500, and the control part 500, based on the received sensing result, can control the folding configuration of the foldable display 10.

The control part 500 can communicate with components included in the foldable display 10 to control the components.

In particular, the control part 500 can communicate with the rear surface touch sensor part 300 to detect a first touch input applied to a first rear surface region and a second touch input applied to a second rear surface region. More specifically, the control part 500 can receive a sensing result of the touch input applied to the rear surface region from the rear surface touch sensor part 300. The rear surface touch sensor part 300 can sense the coordinates of the touch input applied to the rear surface region and transmit the sensing result to the control part 500. The control part 500, based on the received sensing result of the touch input, can separately detect the first touch input applied to the first rear surface region and the second touch input applied to the second rear surface region.

The control part 500 can detect a moving direction of the first and second touch inputs. More specifically, the control part 500 can communicate with the rear surface touch sensor part 300 and detect when the first touch input moves in a first direction and the second touch input moves in a second direction. Here, the first and second directions can be substantially opposite to each other. Further, a substantially opposite direction can generally refer to a substantially opposite direction including situations where not only the angle formed by the first and second directions is about 180 degrees, but also when the angle is in the range of about 120 degrees to about 240 degrees.

When the first touch input in the first direction and the second touch input applied to the second direction are detected, the control part 500 can transmit the folding control signal to the folding adjustment part 400 to switch the folding configuration of the foldable display 10. A more detailed description will be given below with reference to FIGS. 2A and 2B.

Alternatively, the control part 500 can communicate with the rear surface sensor part 300 and detect moving distances of the first and second touch inputs. The control part 500 can communicate with the rear surface touch sensor part 300 and detect the first distance of the first touch input and the second distance of the second touch input. The control part 500 can generate a folding control signal for switching the folding configuration of the foldable display 10 based on the first and second distances and transmit the generated signal to the folding adjustment part 400. A more detailed description will be given below with reference to FIGS. 3A to 4C.

Alternatively, the control part 500 can communicate with the rear surface touch sensor part 300 and detect moving speeds of the first and second touch inputs. The control part 500 can communicate with the rear surface touch sensor part 300 and detect a first speed of the first touch input and a second speed of the second touch input. The control part 500 can generate a folding control signal for switching the folding configuration of the foldable display 10 based on the first and second speeds and transmit the generated signal to the folding adjustment part 400. A more detailed description will be given below with reference to FIGS. 3A to 4C.

Meanwhile, although not illustrated in the drawings, in an additional embodiment, a shape-memory film formed of shape-memory alloy or shape-memory polymer can be formed on the foldable display panel 100. Particularly, the film can be a shape-memory film that "remembers" an unfolded shape under a high-temperature and high-humidity environment.

The foldable display panel 100 can continuously receive a relatively large amount of stress in a compressed configuration in the first configuration of the foldable display 10. Particularly, while the first configuration is maintained over a period of time, continuous stress is applied to the folding axis of the foldable display panel 100. As a result, the folding axis of the foldable display panel 100 may be deteriorated over time, leading to a reduction in the display characteristics.

Therefore, under a high-temperature or high-humidity environment, that is, under environmental conditions in which additional stress can be applied to the foldable display panel 100, the foldable display panel 100 can include a shape-memory film that autonomously reduces the stress. The shape-memory film can be unfolded by itself under a high-temperature or high-humidity environment, so that the foldable display panel 100 is unfolded together. As a result, the foldable display 10 can be automatically switched into the second configuration under a high-temperature or high-humidity environment. Accordingly, the folding configuration of the foldable display panel 100 can be switched by the current configuration of the surroundings instead of by the folding adjustment part 400.

FIG. 1 is a block diagram of a foldable display 10 according to an embodiment. Separately illustrated blocks are logically distinguished components of the foldable display 10. Accordingly, the above-mentioned components of the foldable display 10 can be mounted as one chip or a plurality of chips according to the design of the display. Depending on embodiments, certain elements may be removed from or additional elements may be added to the foldable display 10 illustrated in FIG. 1. Furthermore, two or more elements may be combined into a single element, or a single element may be realized as multiple elements. This also applies to the remaining disclosed embodiments.

Hereinafter, for convenience of description, the control part 500 and the foldable display 10 will be described as the same component.

Figure 2A:
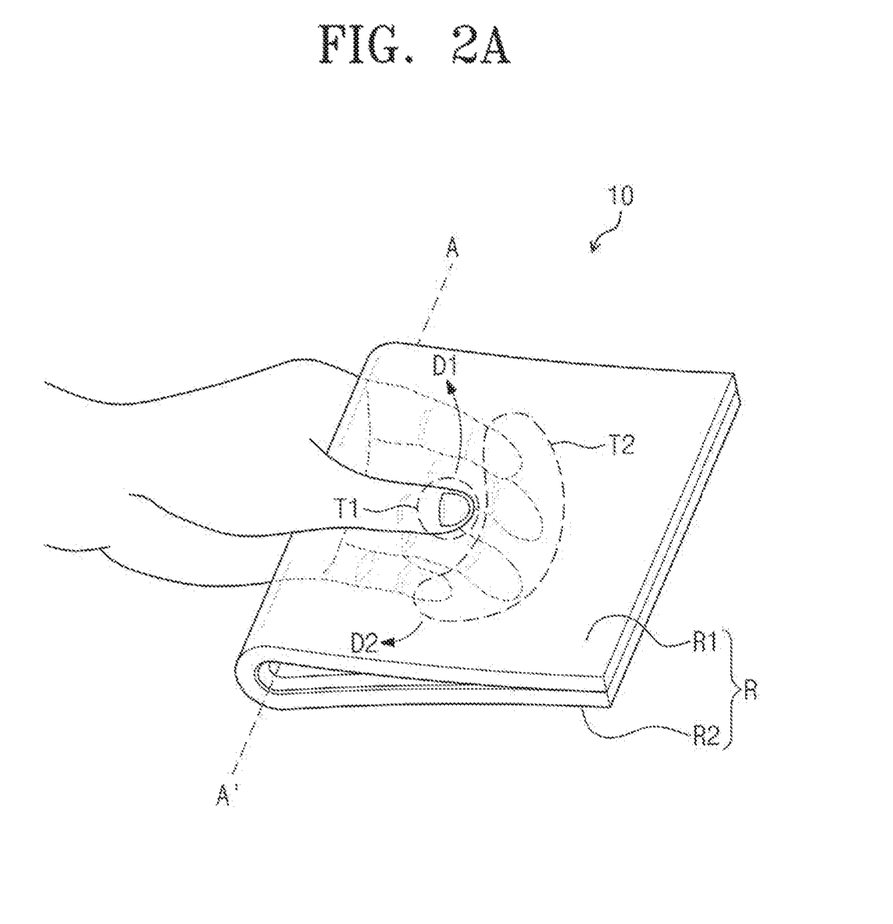
FIG. 2A is a view illustrating a foldable display in a first configuration.
Figure 2B:
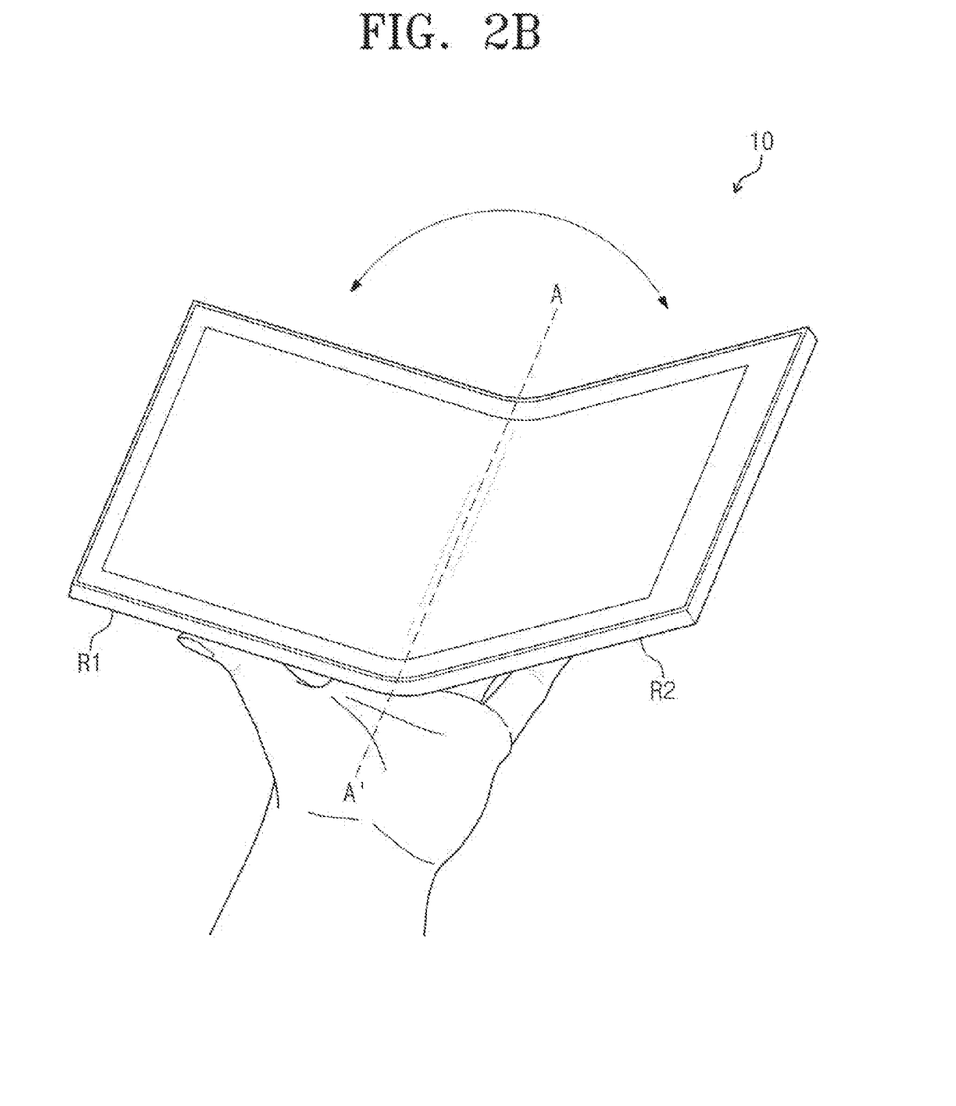
FIG. 2B is a view illustrating a foldable display being switched from a first configuration to a second configuration.

FIG. 2A is a view illustrating a foldable display in a first configuration. FIG. 2B is a view illustrating a foldable display being switched from a first configuration to a second configuration.

Referring to FIGS. 2A and 2B, the foldable display 10 can switch the folding configuration of the foldable display 10 after detecting a predetermined touch input applied to a rear surface R of the foldable display 10.

The foldable display 10 can detect a first touch input T1 applied to a first rear surface region R1 and a second touch input T2 applied to a second rear surface region R2, which are subdivided with respect to a folding axis A-A'. The foldable display 10 can detect the first and second touch inputs T1 and T2 by using a rear surface touch sensor part 300.

When the first and second touch inputs T1 and T2 move, the foldable display 10 can detect the moving directions of the first and second touch inputs T1 and T2. When the first and second touch inputs T1 and T2 move in different directions from each other, the foldable display 10 can switch the folding configuration of the foldable display 10 by using a folding adjustment part 400.

More specifically, the foldable display 10 can detect that the first touch input T1 moves in a first direction D1 and the second touch input T2 moves in a second direction D2. Here, the first and second directions D1 and D2 can designate directions that are different from each other. For example, the first and second directions D1 and D2 can be substantially opposite directions. The foldable display 10 can switch the folding configuration of the foldable display 10 by controlling the folding adjustment part 400. For example, the foldable display 10 in a first configuration can be switched into a second configuration, and the foldable display 10 in the second configuration can be switched into the first configuration. The drawings illustrate the foldable display 10 as being switched from the first configuration to the second configuration.

The foldable display configuration 10 can detect touch inputs simultaneously at a plurality of points on the rear surface R thereof as the first and/or second touch inputs T1 and T2. More specifically, touch inputs can be simultaneously sensed at a plurality of points on a first rear surface region R1 and can be detected as the first touch input T1. Similarly, touch inputs simultaneously can be sensed at a plurality of points on a second rear surface region R2 and can be detected as the second touch input T2.

When at least one touch input detected as the first touch input T1 moves in a first direction D1, the foldable display 10 can detect that the first touch input T1 moves in the direction D1. Alternatively, when at least one touch input detected as the second touch input T2 moves in a second direction D2, the foldable display 10 can detect that the second touch input T2 moves in the direction D2.

For example, as illustrated in the current drawing, when the thumb of a user is positioned at the first rear surface region R1, and the remaining four fingers are positioned at the second rear surface region R2, the foldable display 10 can detect the touch input by the thumb as the first touch input T1 and detect the touch inputs by the remaining four fingers as the second touch input T2. Here, when the thumb moves in the first direction D1 while maintaining contact with the first rear surface region R1, the foldable display 10 can detect the movement of the first touch input T1 in the first direction D1. Likewise, when at least one finger among the remaining four fingers moves in the second direction D2, while maintaining contact with the second rear surface region R2, the foldable display 10 can detect the movement of the second touch input T2 in the second direction D2.

In the standard display, users are required to directly operate the foldable display 10 by two hands to switch the folding configuration of the foldable display 10. However, in the foldable display 10 according to at least one embodiment, users can switch the folding configuration of the foldable display 10 by operating with only one hand. Particularly, according to at least one embodiment of the foldable display 10, by using the fact that a user's hand can be naturally placed on the rear surface R of the foldable display 10, a user's hand motions with respect to the rear surface R of the foldable display 10 are tracked, and thus, a more convenient and easy control method for the foldable display 10 can be provided. Accordingly, when moving, or also when being allowed to use only one hand, users can use the foldable display 10 by simply switching the folding configuration of the foldable display 10.

Figure 3A:
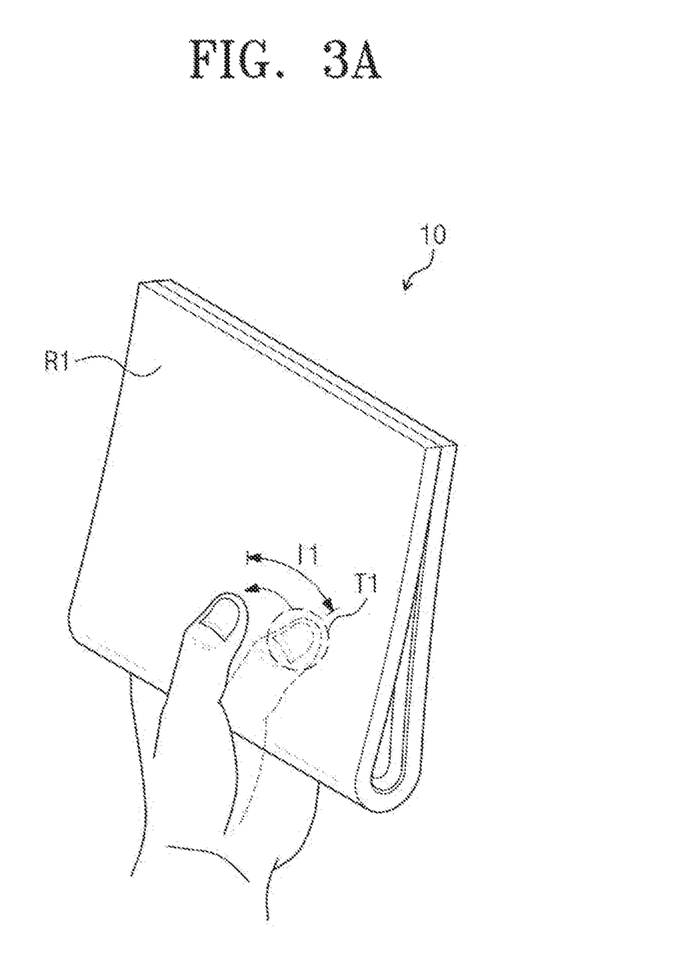
FIG. 3A is a view illustrating an embodiment of a foldable display in a first configuration in which a first touch input applied to a first rear surface region is detected.
Figure 3B:
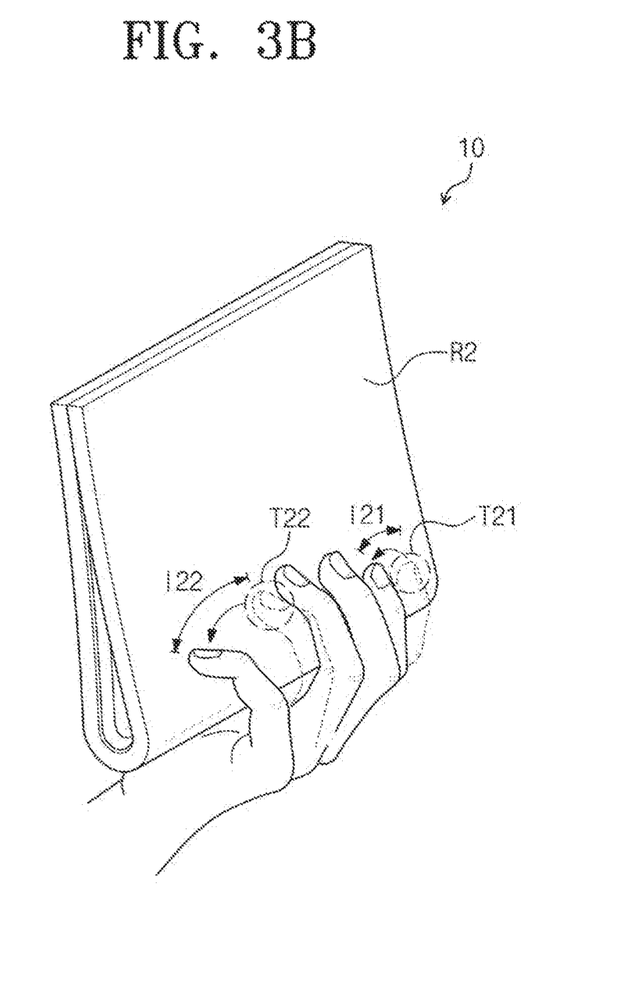
FIG. 3B is a view illustrating an embodiment of a foldable display in a first configuration in which a second touch input applied to a second rear surface region is detected.

FIG. 3A is a view illustrating an embodiment of a foldable display in a first configuration in which a first touch input applied to a first rear surface region is detected. FIG. 3B is a view illustrating an embodiment of a foldable display in a first configuration in which a second touch input applied to a second rear surface region is detected.

Referring to FIGS. 3A and 3B, the foldable display 10 can detect the moving distances of the first and second touch inputs T1 and T2 by using the rear surface touch sensor part 300 and switch the folding configuration thereof based on the detected moving distances of the first and second touch inputs T1 and T2.

More specifically, referring to FIG. 3A, the foldable display 10 can detect a first distance 11, which is the moving distance of the first touch input T1 applied to the first rear surface region R1, by using the rear surface touch sensor part 300. For example, the foldable display 10 can acquire information about the current coordinates of the first touch input T1 from the rear surface touch sensor part 300 and detect the first distance 11 of the first touch input based on the coordinate information.

Referring to FIG. 3B, the foldable display 10 can detect a second distance 12 which is the moving distance of the second touch input T2 applied to the second rear surface region R2 by using the rear surface touch sensor part 300.

Additionally, the foldable display 10 can acquire information about the current coordinates of second touch input T2 from the rear surface touch sensor part 300 and detect the second distance 12. However, as illustrated in FIG. 3B, when a plurality of touch inputs T21 and T22 are detected as the second touch input T2, the foldable display 10 can detect the moving distance of the second touch input T2 in various embodiments.

As an embodiment, the foldable display 10 can detect the moving distance of one touch input of the detected touch inputs T21 and T22 as the second touch input T2. Particularly, the foldable display 10 can detect the maximum moving distance 122 or the minimum moving distance 121 of moving distances 121 and 122 of the touch inputs T21 and T22 detected as the second touch input T2, as the second distance.

As another embodiment, the foldable display 10 can detect, as the second distance, the average moving distance of the touch inputs T21 and T22 detected as the second touch input T2. Accordingly, after acquiring the moving distances 121 and 122 of each of the touch inputs T21 and T22 detected as the second touch input, the foldable display 10 can calculate the average value of the moving distances 121 and 122, which can be detected as the second distance.

In addition, the foldable display 10 can detect the second distance of a plurality of touch inputs in various embodiments. Also, the first distance of the touch inputs detected as the first touch input T1 can be detected in the same manner as described above.

When the first and second distances are greater than a threshold distance, the foldable display 10 can switch the folding configuration of the foldable display 10 (see FIG. 2B). More specifically, the foldable display 10 can detect that the first distance l1 is greater than the first threshold distance and the second distance l2 is greater than the second threshold distance. Accordingly, the foldable display 10 can be switched from the first configuration to the second configuration or from the second configuration to the first configuration. The first and second threshold distances can be substantially the same. The first and second threshold distances can be determined according to the design, structure, manufacturing company, purpose of use, size, user's setting, materials of the rear surface, etc. of the foldable display 10. Alternatively, the foldable display 10 can determine the switching amount of the folding configuration according to the first and second distances, and switch the folding configuration. More detailed descriptions about this will be given below with reference to FIGS. 4A to 4C.

Meanwhile, although not illustrated in the drawings, in an embodiment similar to the above-described embodiment, the foldable display 10 can detect moving speeds of the first and the second touch inputs T1 and T2 by using the rear surface touch sensor part 300, and switch the folding configuration based on the detected moving speeds.

More specifically, the foldable display 10 can detect a first speed, which is the moving speed of the first touch input T1, by calculating the moving distance per unit time of the first touch input T1 by using the rear surface touch sensor part 300. Likewise, the foldable display 10 can detect a second speed, which is the moving speed of the second touch input T2, by calculating the moving distance per unit time of the second touch input T2 by using the rear surface touch sensor part 300.

When a plurality of touch inputs are detected as the first or second touch input T1 or T2, the foldable display 10 can detect, as the first or second speed, the maximum or minimum moving speed of moving speeds of the detected touch inputs in each of the rear surface regions R1 and R2. Alternatively, the foldable display 10 can detect the average moving speed of the touch inputs detected in each of the rear surface regions R1 and R2 as the first or second speed. Detailed description about this embodiment are similar to those described above with reference to FIGS. 3A to 3C.

When the first and second speeds are greater than a threshold speed, the foldable display 10 can switch the folding configuration thereof. More specifically, when the first speed is greater than a first threshold speed, and the second speed is greater than the second threshold speed, the foldable display 10 can switch the folding configuration thereof. Here, the first and second threshold speeds can be substantially the same. The first and second threshold speeds can also be determined according to the design, structure, manufacturing company, purpose of use, size, user's setting, materials of the rear surface, etc. of the foldable display 10.

Alternatively, the foldable display 10 can switch the folding configuration by determining the switching amount of the folding configuration according to the first and second speeds. More detailed descriptions about this will be given below with reference to FIGS. 4A to 4C.

Figure 4A:
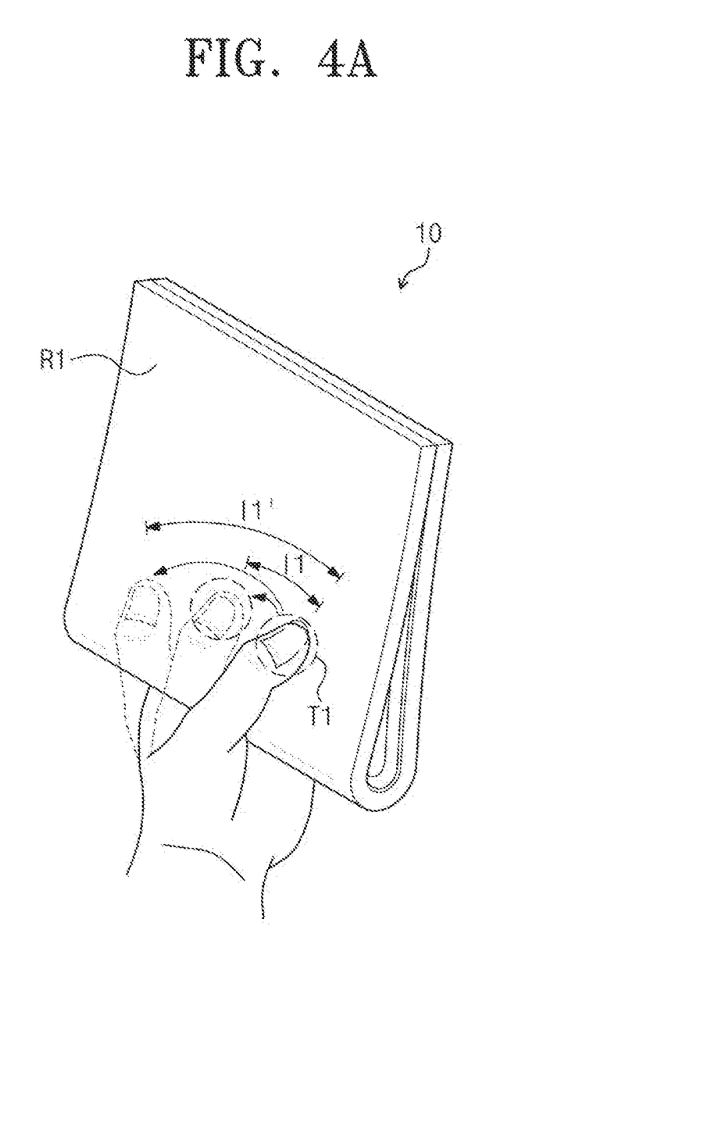
FIG. 4A is a view illustrating an embodiment of a foldable display in a first configuration in which a first touch input applied to a first rear surface region is detected.
Figure 4B:
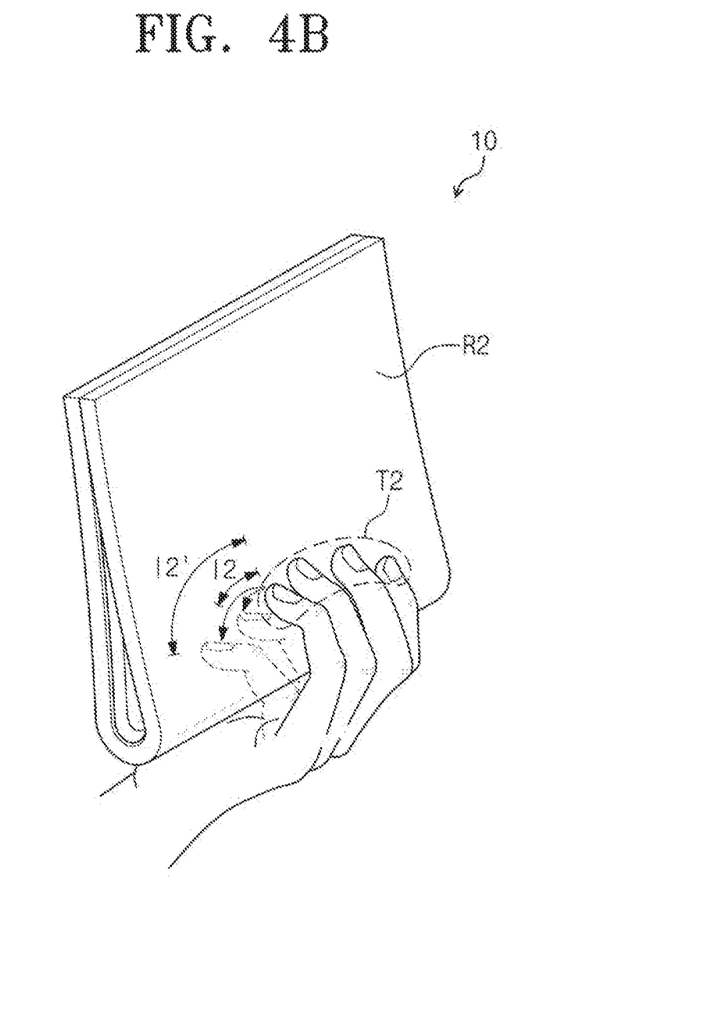
FIG. 4B is a view illustrating an embodiment of a foldable display in a first configuration in which a second touch input applied to a second rear surface region is detected.
Figure 4C:
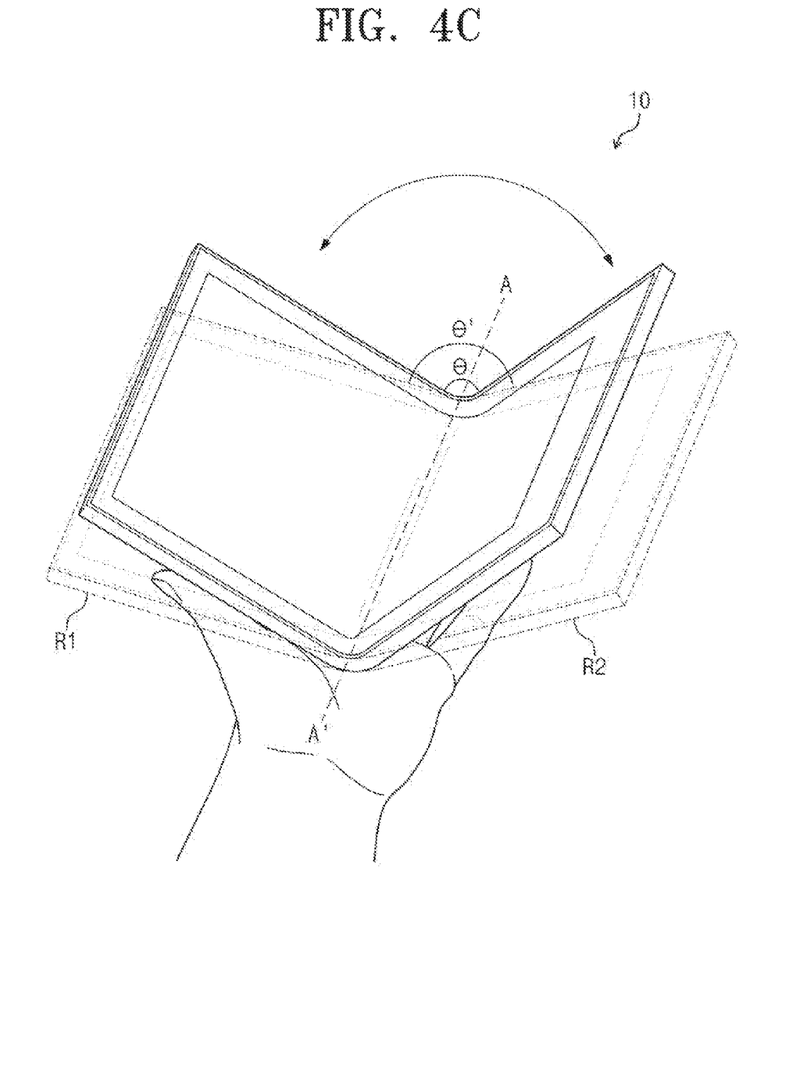
FIG. 4C is a view illustrating an embodiment of a foldable display being switched from a first configuration to a second configuration.

FIG. 4A is a view illustrating an embodiment of a foldable display in a first configuration in which a first touch input applied to a first rear surface region is detected. FIG. 4B is a view illustrating an embodiment of a foldable display in a first configuration in which a second touch input applied to a second rear surface region is detected. FIG. 4C is a view illustrating an embodiment of a foldable display being switched from a first configuration to a second configuration.

Referring to FIGS. 4A to 4C, the foldable display 10 can switch the folding configuration by determining the switching amount of the folding configuration according to the detected moving distances of the first and second touch inputs. The foldable display 10 can determine a folding angle or an unfolding angle in proportion to the first and second distances and switch the folding configuration of the foldable display 10 by the determined folding or unfolding angle. Accordingly, as the first and second distances increase, the angle by which the foldable display 10 is folded or unfolded can also increase by a corresponding amount. Similarly, as the first and second distances decrease, an angle by which the foldable display 10 is folded or unfolded can also decrease by a corresponding amount.

For example, the foldable display 10 in a first configuration can respectively detect l1 as the first distance and l2 as the second distance. The foldable display 10 in the first configuration can be unfolded by an unfolding angle of $\theta$ corresponding to l1 and l2 to be switched to the second configuration. Also, the foldable display 10 in the first configuration can respectively detect i1' as the first distance and i2' as the second distance. Here, l1' may be greater than l1 and l2' may be greater than l2. Thus, the foldable display 10 can be unfolded by an angle of $\theta$' corresponding to l1' and l2' to be switched to the second configuration. Here, $\theta$' may be greater than $\theta$.

So far, descriptions are given of a foldable display 10 which can be switched from the first configuration to the second configuration. However, the above description can also be applied in substantially the same manner to a foldable display 10 which is switched from the second configuration to the first configuration. Accordingly, the foldable display 10 can determine a folding angle corresponding to the first and second distances and can be switched from the second configuration to the first configuration by the determined folding angle.

The foldable display 10 can store the folding or unfolding angle corresponding to the first and second distances in a memory in the form of a lookup table. Accordingly, the foldable display 10 can receive the folding or unfolding angle corresponding to the first and second distances, so that the folding or unfolding angle can be determined. Alternatively, the foldable display 10 can calculate the folding or unfolding angle by applying the first and second distances to a predetermined equation, so that the folding or unfolding angle can be determined. For example, the foldable display 10 can calculate the sum of the first and second distances or an average value and determine the folding or unfolding angle corresponding to the calculated values.

Also in the current embodiment, as described above with reference to FIGS. 3A and 3B, when a plurality of touch inputs are detected as the first or second touch inputs T1 or T2, the foldable display 10 can detect, as the first or second distance, the maximum or minimum moving distance of moving distances of the detected touch inputs in each of the rear surface regions R1 and R2. Alternatively, foldable display 10 can detect the average distance of moving distances of the touch inputs as the first or second distance.

Additionally, although not illustrated in the drawings, in an embodiment similar to the above-described embodiment, the foldable display 10 can determine the switching amount of the folding configuration corresponding to the detected moving speeds of the first and the second touch inputs T1 and T2. The foldable display 10 can determine a folding angle or an unfolding angle in proportion to the first and second distances and switch the folding configuration of the foldable display 10 by the determined folding or unfolding angle. The above description with reference to FIGS. 4A to 4C can also be similarly applied to the current embodiment.

According to at least one embodiment, since a folding configuration can be easily controlled by only a simple touch operation of a user, the switching between configurations can be more intuitive and convenient for a user.

Although each drawing is individually described for convenience of description, it is possible to combine the embodiments described in each drawing and design and implement a new embodiment. Also, the foldable display may not be limited to the configuration and methods of the embodiments as mentioned above, but the above-mentioned embodiments can also be configured such that all or a part of each embodiment cab be selectively combined and various modifications could thus be achieved.

Furthermore, although preferred embodiments are illustrated and described above, the specification is not limited to a specific embodiment mentioned above. Various modifications are possible by those skilled in the art without departing from the spirit and scope of the claims. Also, such modifications should not be understood separately from the spirit and scope of the inventive technology.

What is claimed is:

1. A foldable display, comprising:
    a foldable display panel;
    a motor configured to adjust a folding configuration of the foldable display panel, wherein the folding configuration comprises a first configuration in which the foldable display panel is folded along a folding axis and a second configuration in which the foldable display panel is unfolded;
    a folding sensor configured to sense the folding configuration of the foldable display panel;
    a rear surface touch sensor configured to sense a touch input applied to a rear surface of the foldable display panel, wherein the rear surface is divided along the folding axis into first and second rear surface regions; and
    a controller configured to control the foldable display panel, the motor, the folding sensor, and the rear surface touch sensor,
    wherein the controller is further configured to:
        detect a first touch input applied to the first rear surface region and a second touch input applied to the second rear surface region via signals received from the rear surface touch sensor; and
        control the motor so as to switch the folding configuration of the foldable display panel when the controller detects that the first touch input moves in a first direction and the second touch input moves in a second direction different from the first direction, wherein the first direction is along a plane parallel to the first rear region and the second direction is along a plane parallel to the second rear region.

2. The foldable display of claim 1, wherein the controller is further configured to control the folding adjustment part to switch the foldable display panel from the first configuration to the second configuration or from the second configuration to the first configuration when the controller detects that the first touch input moves in the first direction and the second touch input moves in the second direction.

3. The foldable display of claim 2, wherein the first configuration is a configuration in which the foldable display panel is folded along the folding axis such that the foldable display panel is closed, and wherein the second configuration is a configuration in which the foldable display panel is unfolded such that the foldable display panel is open.

4. The foldable display of claim 1, wherein the controller is further configured to detect i) a first distance which is a moving distance of the first touch input in the first direction and ii) a second distance which is a moving distance of the second touch input in the second direction via the signals received from the rear surface touch sensor, and wherein the controller is further configured to control the motor so as to switch the folding configuration of the foldable display panel based on the detected first and second distances.

5. The foldable display of claim 4, wherein the controller is further configured to control the motor so as to switch the folding configuration of the foldable display panel when the controller detects that the first distance is greater than a first threshold distance and the second distance is greater than a second threshold distance.

6. The foldable display of claim 5, wherein the first and second threshold distances are substantially the same.

7. The foldable display of claim 4, wherein the controller is further configured to determine a switching amount of the folding configuration of the foldable display panel based on the detected first and second distances.

8. The foldable display of claim 7, wherein the controller is further configured to: i) determine a folding angle or an unfolding angle of the foldable display panel based on the detected first and second distances, and ii) control the motor so as to switch the folding configuration of the foldable display panel by the determined folding or unfolding angle.

9. The foldable display of claim 1, wherein the controller is further configured to:
    detect i) a first speed which is a moving speed of the first touch input in the first direction and ii) a second speed which is a moving speed of the second touch input in the second direction via the signals received from the rear surface touch sensor; and
    control the motor so as to switch the folding configuration of the foldable display panel based on the detected first and second speeds.

10. The foldable display of claim 9, wherein the controller is further configured to control the motor so as to switch the folding configuration of the foldable display panel when the first speed is greater than a first threshold speed and the second speed is greater than a second threshold speed.

11. The foldable display of claim 10, wherein the first and second threshold speeds are substantially the same.

12. The foldable display of claim 9, wherein the controller is further configured to determine a switching amount of the folding configuration of the foldable display panel based on the detected first and second distances.

13. The foldable display of claim 12, wherein the controller is further configured to: i) determine a folding angle or an unfolding angle of the foldable display panel based on the detected first and second distances, and ii) control the motor so as to switch the folding configuration of the foldable display panel by the determined folding or unfolding angle.

14. The foldable display of claim 1, wherein the first and second directions are substantially opposite to each other.

15. The foldable display of claim 1, further comprising a shape-memory film formed over the foldable display panel and formed of shape-memory alloy or shape-memory polymer.

16. A method of controlling a foldable display, the method comprising:
    detecting first and second touch inputs applied to a rear surface of the foldable display, wherein the foldable display is configured to be folded along a folding axis, wherein the rear surface is divided into first and second rear surface regions with respect to the folding axis, wherein the first touch input is a touch input applied to the first rear surface region, and wherein the second touch input is a touch input applied to the second rear surface region;

detecting whether the first touch input moves in a first direction and the second touch input moves in a second direction different from the first direction, wherein the first direction is along a plane parallel to the first rear region and the second direction is along a plane parallel to the second rear region; and switching a folding configuration of the foldable display, wherein the folding configuration comprises a first configuration in which the foldable display is folded along the folding axis and a second configuration in which the foldable display is unfolded.

17. The method of claim 16, wherein the switching of the folding configuration comprises switching the foldable display from the first configuration to the second configuration or from the second configuration to the first configuration.

18. The method of claim 16, further comprising, detecting a first distance which is a moving distance of the first touch input in the first direction, and a second distance which is a moving distance of the second touch input in the second direction; and switching the folding configuration of the foldable display based on the detected first and second distances.

19. The method of claim 16, further comprising:

detecting a first speed which is a moving speed of the first touch input in the first direction, and a second speed which is a moving speed of the second touch input in the second direction; and switching the folding configuration of the foldable display based on the detected first and second speeds.

20. The method of claim 16, wherein the first and second directions are substantially opposite to each other.

* * * * *